No. 674,154. Patented May 14, 1901.
W. H. BAKER & F. E. KIP.
WEFT REPLENISHING MECHANISM FOR LOOMS.
(Application filed Oct. 8, 1900.)
(No Model.) 10 Sheets—Sheet 4.

WITNESSES:
INVENTORS:
William H. Baker
Frederic E. Kip
BY
ATTORNEY

No. 674,154. Patented May 14, 1901.
W. H. BAKER & F. E. KIP.
WEFT REPLENISHING MECHANISM FOR LOOMS.
(Application filed Oct. 3, 1900.)
(No Model.) 10 Sheets—Sheet 6.

WITNESSES:

INVENTORS:
William H. Baker,
Frederic E. Kip.
BY
ATTORNEY

No. 674,154. Patented May 14, 1901.
W. H. BAKER & F. E. KIP.
WEFT REPLENISHING MECHANISM FOR LOOMS.
(Application filed Oct. 3, 1900.)

(No Model.) 10 Sheets—Sheet 7.

WITNESSES:

INVENTORS:
William H. Baker
Frederic E. Kip
BY
ATTORNEY

No. 674,154. Patented May 14, 1901.
W. H. BAKER & F. E. KIP.
WEFT REPLENISHING MECHANISM FOR LOOMS.
(Application filed Oct. 3, 1900.)

(No Model.) 10 Sheets—Sheet 9.

WITNESSES: INVENTORS:
William H. Baker.
Frederic E. Kip.
BY
ATTORNEY

UNITED STATES PATENT OFFICE.

WILLIAM H. BAKER, OF CENTRAL FALLS, RHODE ISLAND, AND FREDERIC E. KIP, OF MONTCLAIR, NEW JERSEY.

WEFT-REPLENISHING MECHANISM FOR LOOMS.

SPECIFICATION forming part of Letters Patent No. 674,154, dated May 14, 1901.

Application filed October 3, 1900. Serial No. 31,871. (No model.)

*To all whom it may concern:*

Be it known that we, WILLIAM H. BAKER, residing at Central Falls, Providence county, Rhode Island, and FREDERIC E. KIP, residing at Montclair, Essex county, New Jersey, citizens of the United States, have invented certain new and useful Improvements in Weft-Replenishing Mechanism for Looms, of which the following is a specification.

This invention relates to a loom having an automatically-operated weft or filling supplying mechanism, the said mechanism belonging to the class of "shuttle-changers" as distinguished from "weft-case changers" or "bobbin-changers."

Two embodiments of the invention are herein shown, one employing electrical controlling devices and the other mechanical controlling devices.

In order that the novel features of the present invention may be the better understood and the better distinguished from what is known in the art, it may be well to say that in the prior art, as illustrated in our United States Patents—namely, No. 637,753, dated November 21, 1899, and No. 637,695, dated November 21, 1899—a vibrating shuttle-placer or auxiliary shuttle-box is employed which rests normally adjacent to a shuttle-magazine and receives a full shuttle from the latter. When the active shuttle in the loom is substantially exhausted of weft or filling, the active or normal shuttle-box is displaced by suitable mechanism and its place taken by the auxiliary box or placer containing the full shuttle. This auxiliary box or placer remains alined with the raceway and in position for picking the shuttle therefrom until the shuttle is picked through the shed in the warp. It will be noted that in all this class of shuttle-changers the shuttle is picked from the placer or auxiliary shuttle-box and that there is some liability of the shuttle being deflected upward in picking into the upper web of the warp, owing to slight variations in the position assumed by the placer in respect to the raceway.

According to the present invention a two-celled shuttle-box is employed, and this box is adapted to be shifted so as to put either cell thereof into picking position with respect to the raceway. A shuttle-feeder is employed, and this feeder takes the full shuttle from any suitable magazine and transfers it to the normally inactive cell of the double-celled box, and from this cell the shuttle is picked and not from a shuttle-placer or from an auxiliary shuttle box or holder. As herein shown, the cells of the shuttle-box are conveniently shown as situated one above the other, the upper one being the normally active cell and the lower one the normally inactive cell. The box has a movement up and down to bring either cell into alinement with the raceway. The shuttle-feeder occupies normally a position adjacent to a shuttle-magazine, from which the shuttles are taken one by one by the feeder for transfer to the cell of the shuttle-box.

The invention will be more fully described hereinafter with reference to the accompanying drawings, whereof—

Figures 1 to 7 illustrate the embodiment of the invention, wherein electrical controlling devices are employed.

Figs. 8 to 18 illustrate the embodiment of the invention where mechanical controlling devices are employed.

Figs. 19, 20, 21, 22, and 23 illustrate the two-speed mechanism of the loom.

Premising that the construction of the two embodiments of the invention herein shown are substantially the same except as to the controlling devices, that embodiment illustrated in Figs. 1 to 7 will be first described.

Figure 1:
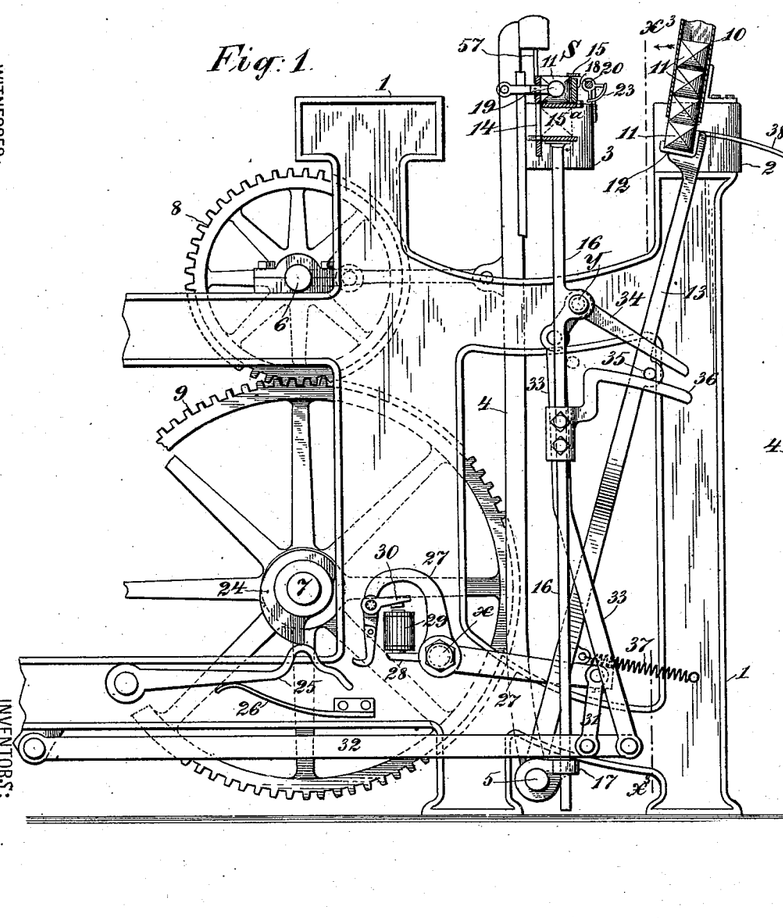
Fig. 1 is a side elevation, partly in section, of a loom provided with this invention.
Figure 2:
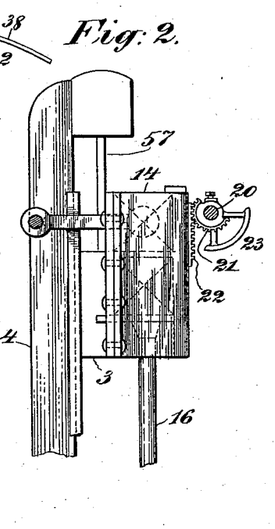
Fig. 2 is an end view of the shuttle-box on a larger scale than Fig. 1, showing the means for closing the side of the lower cell thereof when the double box is elevated.

1 is the frame of the loom, and 2 the breast-beam forming a part thereof.

3 is the lay, and 4 the lay-swords carrying the same.

5 is the rock-shaft.

6 is the crank-shaft from which the lay receives its vibrations.

7 is a cam-shaft, driven from the crank-shaft through gear-wheels 8 and 9. Two rotations of the crank-shaft produce one rotation of the cam-shaft.

10 is a shuttle-magazine mounted on the loom-frame at the front of the loom. As herein shown, the magazine is open at the bottom and the shuttles 11, superposed therein, descend by gravity one by one into a shuttle-feeder 12, which normally occupies a position of rest under the magazine, as seen in Fig. 1, where the magazine is represented in section.

Figures 3, 4, 5:
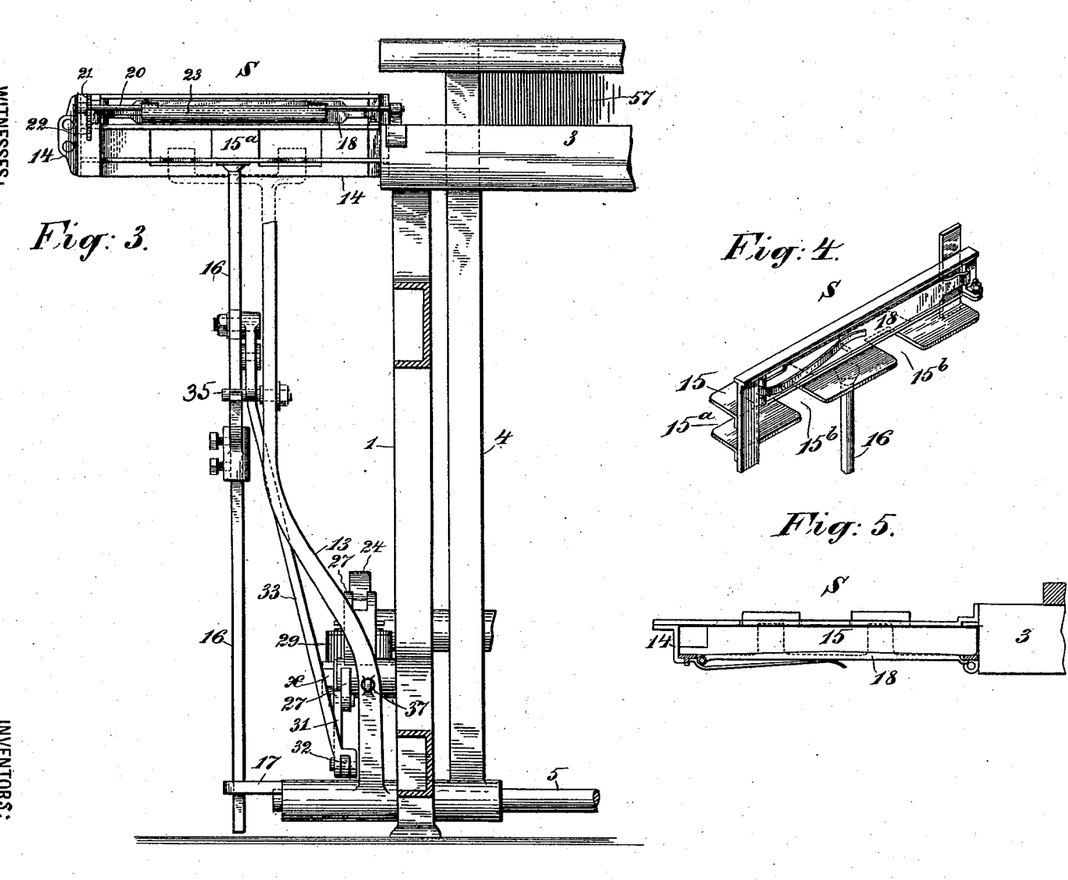
Fig. 3 is a sectional front elevation as seen from the right in Fig. 1, the plane of the section being indicated, substantially, by line $x^3$ in said figure.
Fig. 4 is a perspective view of the two-celled shuttle-box detached.
Fig. 5 is a sectional plan of the two-celled shuttle-box, the plane of the section being near the top of same.

The shuttle-feeder 12 is mounted on an arm 13, which turns about the rock-shaft 5 as a center, and it serves to carry a shuttle over to the two-celled shuttle-box S, carried by the lay. This shuttle-box, which is seen detached in Figs. 4 and 5, is mounted to slide up and down vertically in guide 14 on the lay and has two shuttle-cells 15 and 15$^a$, situated one above the other. The upper cell 15 is the normally active cell, being normally alined with the raceway, and the lower cell 15$^a$ is the normally inactive cell, which receives the shuttle from the shuttle-feeder 12 at proper times. The box S is mounted on a rod 16, which plays through a guide 17 below. It may be noted here that the lower cell 15$^a$ is normally open at the front, or that side turned toward the magazine, and the upper cell is normally closed at the front by a swell 18 and at the back by the guide 14, which latter forms an extension of the lay. When the box S is elevated so as to bring the lower cell thereof into alinement with the raceway and the shuttle therein into alinement with the picker 19, the rear side of the upper cell will be open for the discharge of the empty or exhausted shuttle therefrom. When the box S is so elevated, means are provided for closing the open front of the now elevated lower cell, so that it may properly serve as a shuttle-box. This closing means or device is illustrated best in Figs. 2 and 3. Mounted in suitable bearings on the guide 14 is a rock-shaft 20, which has secured on it a rack-segment 21, the teeth of which gear with a rack 22, carried by the box S, whereby when said box is elevated the shaft 20 will be rocked. On the shaft 20 is secured a cylindrical segment 23, which is so rotated by the rock-shaft as to close or sufficiently close the front of the lower cell 15$^a$ when this cell shall be elevated to the picking position.

The means employed for operating the shuttle-feeder 12 and elevating the shuttle-box S, practically at one movement, in order to supply a full shuttle to the loom, will now be described.

On the cam-shaft 7 is secured a cam 24 of suitable form or contour, which as the shaft 7 rotates depresses a cam-lever 25, mounted on the loom-frame and provided with a suitable elevating-spring 26, which keeps the lever pressed up to the cam. Fig. 1 shows the lever 25 depressed to its full extent. Fulcrumed at $x$ on the loom-frame is a hook-lever 27, to which is pivotally secured a hook 28, adapted to be swung out into the path of the free end of the vibrating cam-lever 25 by the controlling means at proper times. In Fig. 1 the controlling means is electrical, and an electromagnet 29, mounted on the lever 27, throws out the hook when excited by attracting its armature 30, carried by an arm on the hook. This device is substantially the same as that shown in our United States Patent No. 655,642, dated August 7, 1900, and will require no further description. At its end opposite to the hook 28 the hook-lever is coupled by a link 31 to a main lever 32 on the loom-frame, and this main lever is coupled by a link or rod 33 to the shorter arm of an elbow-lever 34, fulcrumed at $y$ on the rod 16. The longer arm of the lever 34 extends forward past the arm 13 and over a stud 35, which projects laterally from said arm. In the vibrations of the arm 13 the stud 35, during the first and main portion of its movement in feeding, plays over a curved arm 36, secured to the rod 16.

Let us suppose that the cam-lever 25 is elevated and the excitation of the magnet 29 has thrown out the hook 28 into the path of the cam-lever. As the latter lever is depressed it engages the hook 28 and rocks the hook-lever. This motion is communicated, through the link 31, main lever 32, and rod 33, to the elbow-lever 34. The rocking of the last-named lever causes the longer arm thereof to swing downward, engage the stud 35, and swing the shuttle-feeder 12 over to the shuttle-box S. As the fulcrum $y$ of the elbow-lever 34 is on the rod 16, the reaction tends to lift the shuttle-box S; but in order to prevent the latter from lifting until the feeder shall have placed a shuttle in the lower cell thereof the stud 35 is adapted to play over the curved arm 36, which serves to prevent the rod 16 from lifting until the stud 35 shall have cleared and passed over said arm to the point indicated by the dotted circle in Fig. 1, when the continued movement upward is wholly applied to elevating the shuttle-box S. The sudden upward movement of the shuttle-box, coupled with the rapid vibrations of the lay, displaces the exhausted shuttle and discharges it laterally from the elevated upper cell, and the movements are so timed that the full shuttle supplied will be picked while the box S is elevated.

It is proper to explain here that in order to permit the box S to be elevated while the feeder is still interfolded with it the feeder has two spaced supporting-fingers to take under the shuttle, and when the feeder folds into the lower cell $15^a$ these fingers enter corresponding spaces in the bottom of the said cell. In Fig. 4 these spaces are designated by the numeral $15^b$.

When the cam 24 passes, the feeder 12 is retracted by a suitable spring 37 and the box S descends by gravity. The box must descend far enough to allow the stud 35 to pass over the curved arm 36 before the feeder can return. As the feeder moves out from under the magazine the shuttles would fall out from the latter unless some means were provided to support them. To overcome this difficulty, the back wall of the feeder 12 may be provided with a curved supporting plate or finger 38, which is drawn under the bottom of the magazine as the feeder moves over to the shuttle-box. However, there are various ways of thus supporting the shuttles in the magazine now known in the art—as, for example, a spring-slide which takes under the magazine and is pressed back by the feeder or the device which is to receive the shuttle.

Such a mechanism is shown in our United States Patent No. 633,945, dated September 26, 1899.

Figures 6, 7:
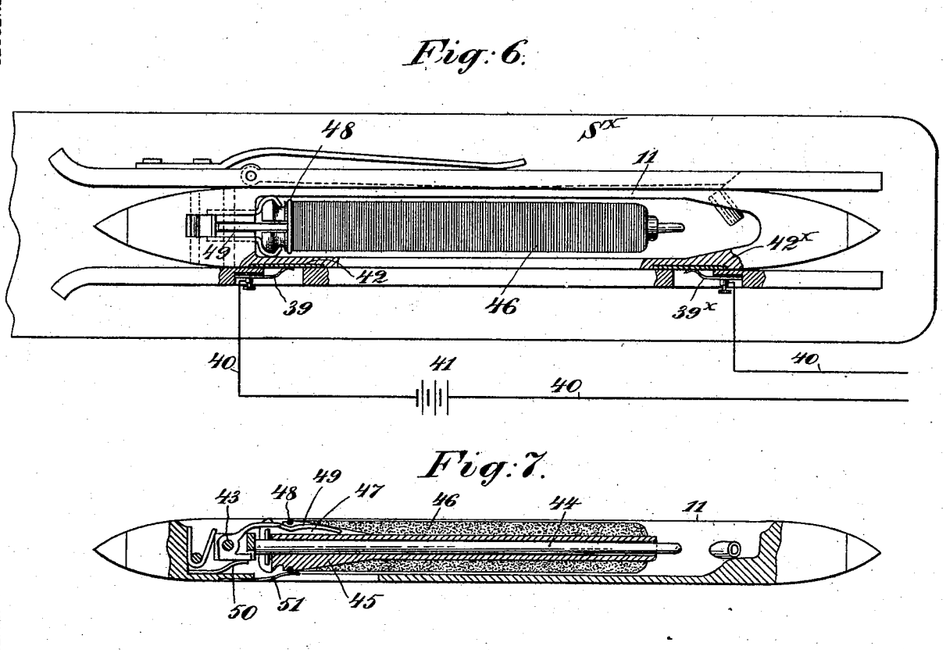
Fig. 6 is a plan view of the shuttle and the shuttle-box at the opposite side of the loom from the magazine, illustrating the electrical connections.
Fig. 7 is a sectional side elevation of the shuttle, also illustrating the electrical controlling devices.

We have shown herein a convenient means for operating the vibratable shuttle feeder or transfer 12 to place the shuttle in the lower shuttle-box and convenient means for at once elevating the connected and superposed shuttle-boxes; but we do not limit ourselves strictly to this construction and operation of the parts, as it is not essential to the proper working of the loom that the supplying of the fresh shuttle to the lower box shall be followed instantly by the elevation of the boxes. There may be an interval between these operations.

Where electrical controlling devices are employed, they may be constructed as illustrated in Figs. 6 and 7. There is nothing especially novel in these devices, but they will be briefly described.

The shuttle-box $S^X$ (seen in Fig. 6) is situated at the opposite side of the loom from the two-celled shuttle-box S, and it is provided with two spring-terminals 39 and $39^X$ of a circuit 40, which includes a generator 41 and the magnet 29. The shuttle 11 has in its side two metal contact-plates 42 and $42^X$, which when the shuttle enters the box are put into contact with the respective terminals 39 and $39^X$. In the shuttle 11 is hinged at 43 a spindle 44, on which is slipped a bobbin 45, carrying weft or filling 46. The bobbin has in its head or enlarged end a longitudinal slot 47, which is crossed by a metal ring 48 about the bobbin-head. When the bobbin is slipped on the spindle, a metal indicator 49, hinged on the same axis as the spindle and backed by a spring 50, enters the slot 47, and its free end takes under the weft, as clearly shown in Fig. 7. The weft holds the indicator pressed out of contact with the ring 48. A metal spring 51 bears on the ring 48. The contact-plate 42 is electrically connected with the indicator 49, and the plate $42^X$ is electrically connected, through the spring 51, with the ring 48. These connections between the contact-plates 42 and $42^X$ with the indicator 49 and spring 51 have not been shown, as they may be concealed wires or conducting-strips in a manner well known to electricians. It will suffice to say that when the weft is nearly exhausted from the bobbin, cop, or other weft or filling holder the indicator 49 will be permitted to contact with the ring 48, which will close the circuit through the magnet 29, and thus set the supplying mechanism in operation.

The embodiment of the invention wherein mechanical controlling devices are employed will now be described with reference to Figs. 8 to 18. As the features of the loom are in general the same as those already described and are designated by the same reference characters it will only be necessary to minutely describe the mechanical controlling devices.

Figure 10:
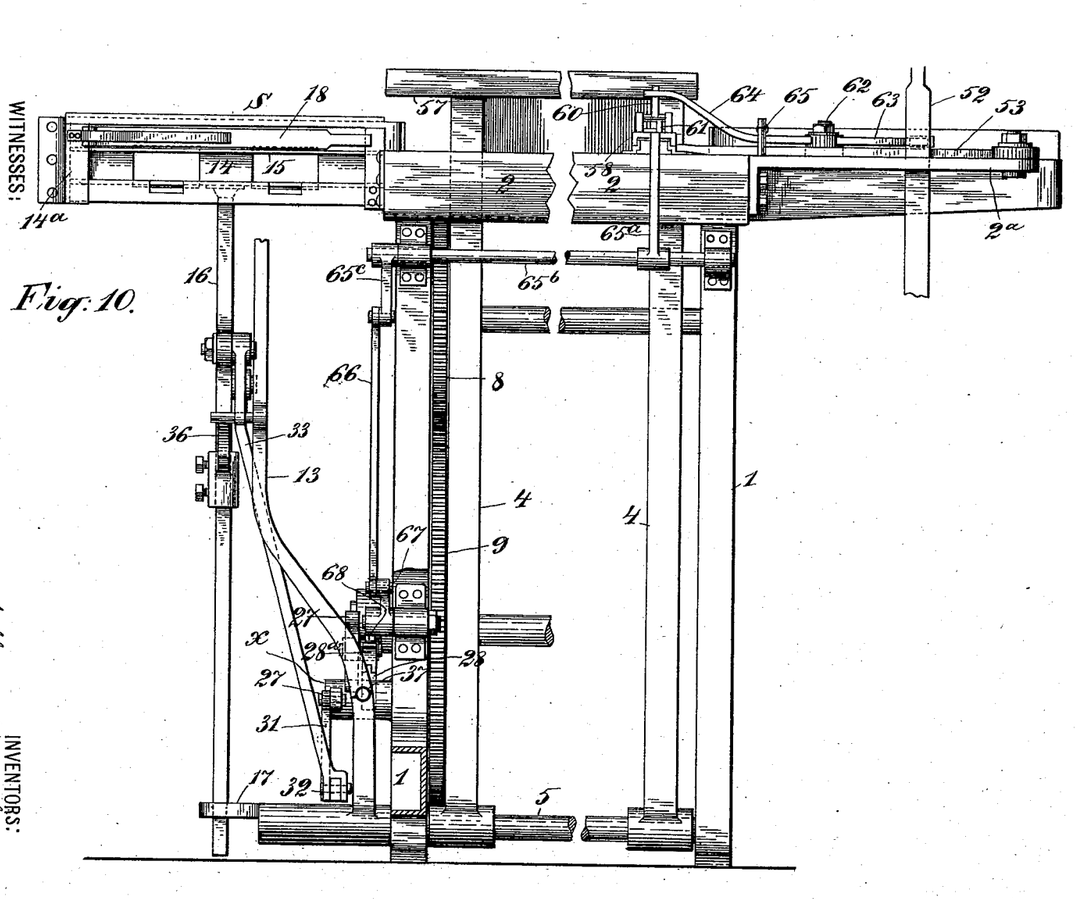
Fig. 10 is a view similar to Fig. 3, but showing both sides of the loom.
Figure 11:
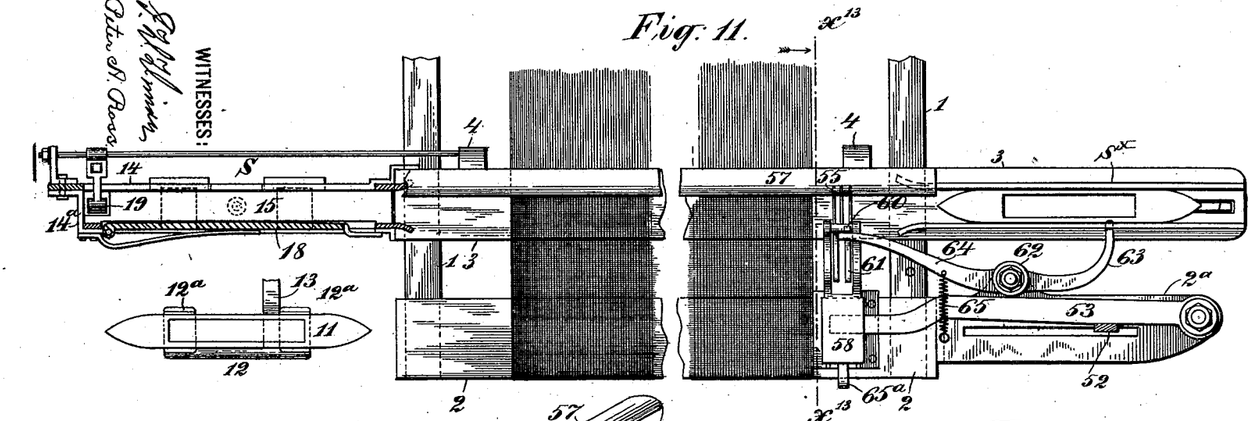
Fig. 11 is a plan of the parts seen in Fig. 10 and showing also the shuttle-feeder in plan.

Referring especially to Figs. 10 and 11, 52 is the shipper-lever. 53 is the knock-off lever. 54 is the weft-fork slide, connected with the knock-off lever for operating the latter. 55 is the weft-fork, pivotally mounted in the slide 54. 56 is the weft-hammer, and 57 is the reed. All of these are common in looms for stopping the loom when the weft-thread breaks or is wanting from any cause. They are shown here merely because of their connection with the novel features of the mechanical controlling device of the weft-supplying mechanism. Mounted to slide on the weft-fork slide is an auxiliary slide 58, in which is mounted a rocker 59, which has an upright arm 60 and a hook-arm 61, the latter being adapted when depressed to be engaged by the vibrating weft-hammer 56 for driving back the slide 58. On the breast-beam, or rather on the bracket $2^a$, which forms an extension laterally thereof, is mounted a feeler-lever, which may vibrate in a horizontal plane about a fulcrum 62. This lever consists of a feeler-arm 63, the tip or nose of which plays through the side wall of the shuttle-box $S^\times$, and a controlling-arm 64, which takes behind the upright 60 of the rocker 59. A spring 65, connected with the feeler-lever, tends to keep the feeler-arm projected, so as to enter the shuttle-box $S^\times$, when the lay beats up to the position seen in Fig. 11.

Figures 8, 9:
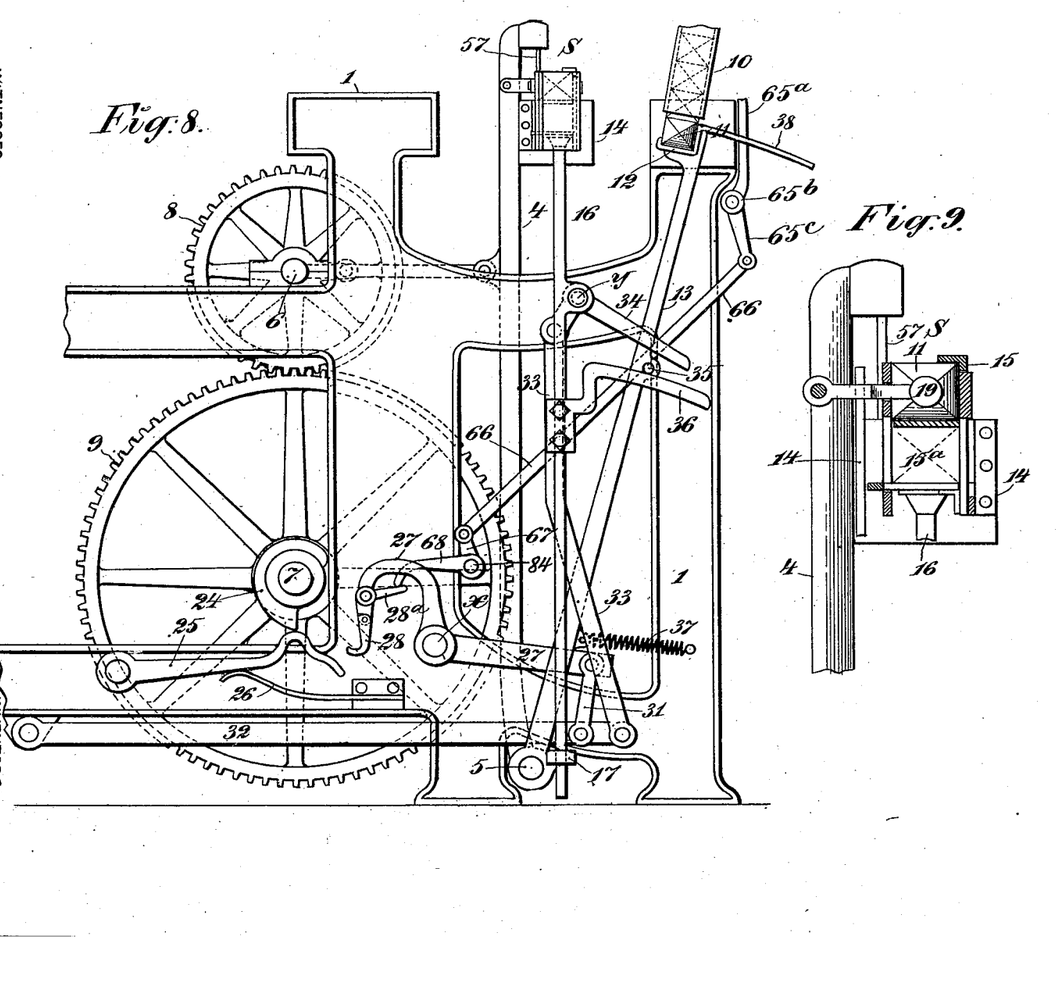
Fig. 8 is a view similar to Fig. 1.
Fig. 9 is a view similar to Fig. 2.

Referring now to Figs. 8 and 10, on the front of the loom-frame is mounted a rock-shaft $65^b$, to which is secured a lever $65^a$, the upper arm of which projects into the path of the auxiliary slide 58, so that when said slide is driven outward by the weft-hammer 56, as will be explained, the lever $65^a$ and its shaft will be rocked. An arm $65^c$ on the rock-shaft is coupled by a rod or link 66 with an arm 67 of a rocker mounted on the loom-frame down near the lever 27. The other arm 68 of said rocker takes over an arm $28^a$ on the hook 28. Now when the slide 58 moves outward and rocks the lever $65^a$ the hook 28 is moved outward into the path of the cam-lever 25, and the supplying mechanism thus operated. The rocker 59 is loosely journaled in the slide 58, so that its heavier hook-arm 61 is normally depressed, the upright arm 60 bearing or resting against the arm 64 of the feeler-lever; but when the lay beats up with a shuttle in the box $S^\times$, if said shuttle shall have in it a full bobbin or weft-holder, the end of the feeler-arm 63 cannot enter the shuttle, (for reasons that will be hereinafter explained,) and this arm 63 will be pressed back, thus causing the controlling-arm 64 to rock the rocker 59 and raise the hook-arm 61 thereof out of the path of the weft-hammer 56, which latter is actuated at this stage of the weaving operation. On the other hand, if the shuttle in the box $S^\times$ at the time the lay beats up contains a weft-holder which is substantially denuded of weft the feeler-arm 63 will be free to enter the shuttle, and the feeler-lever will remain quiescent. The hook-arm 61 (of the rocker 59) will remain in the path of the weft-hammer, and the latter will engage said hook-arm and drive out the slide 58, thus actuating the lever $65^a$ and through it and the intermediate devices already described supply the loom with a fresh shuttle.

It may be explained here that the cam 24 will be so set and proportioned, as the parts are herein shown, that the cam-lever 25 will engage the hook 28 the moment the latter shall be moved into its path, but that the two-celled box S will not be shifted until the empty shuttle shall be picked across from the box $S^\times$ into its upper cell of the box S.

Figure 14:
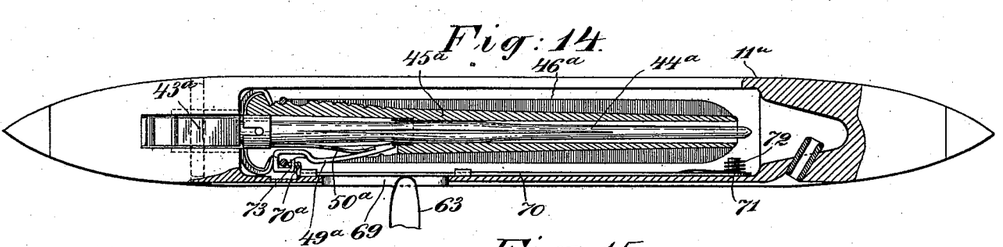
Fig. 14 is a sectional plan view of the shuttle adapted for operation with a feeler mechanism.
Figure 15:
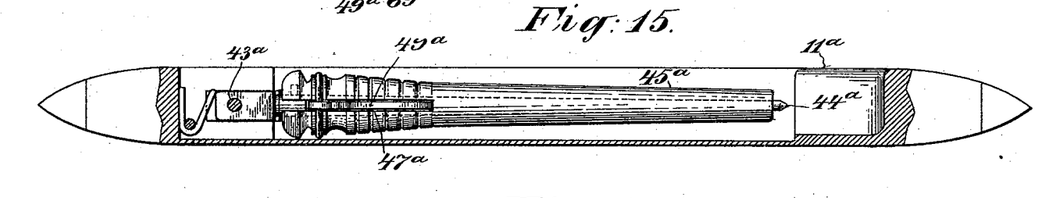
Fig. 15 is a vertical axial longitudinal section of the shuttle, showing the bobbin in elevation and exhausted.
Figure 16:
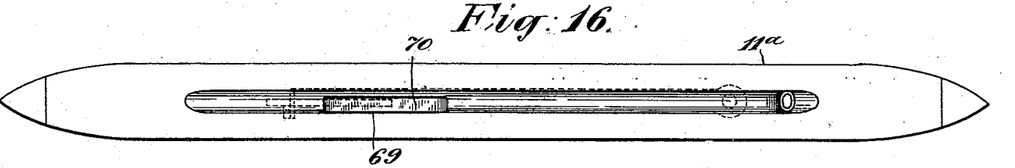
Fig. 16 is a side elevation of the shuttle, showing the side which is below in Fig. 14.
Figure 17:
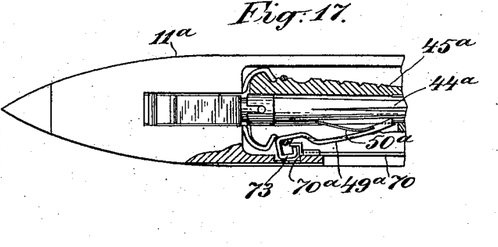
Fig. 17 is a fragmentary sectional view similar to Fig. 4, but showing the bobbin denuded.
Figure 18:
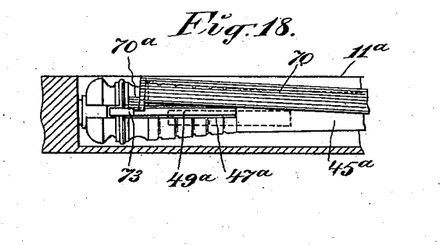
Fig. 18 is a fragmentary view of a part of the shuttle, showing the construction of the wicket and the indicator supporting it.
Figure 19:
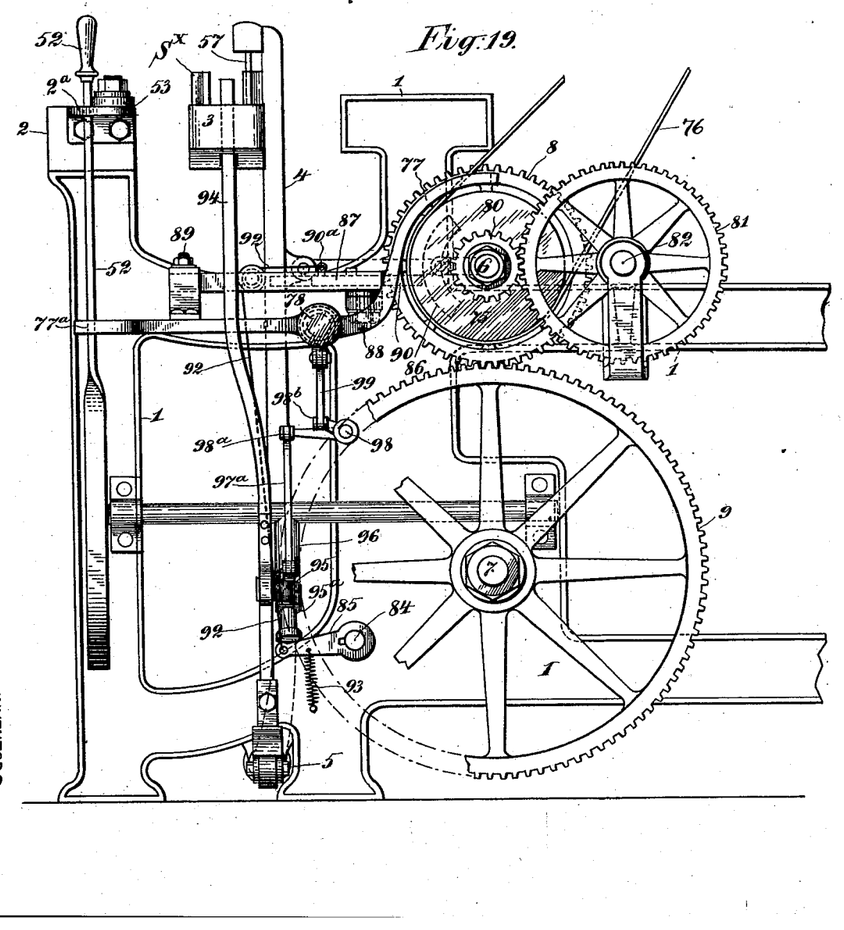
Fig. 19 is a side view showing the side opposite to that seen in Fig. 8.

The construction of the shuttle and bobbin employed in connection with the mechanical controlling devices last described is illustrated in Figs. 14 to 18 and will now be explained. The shuttle $11^a$ may be substantially like that shown in Figs. 6 and 7; but it has in one of its sides an aperture or slot 69, at which the feeler-arm 63 may enter, and on the inner face of this side is mounted a spring plate or wicket 70, pivoted at 71 and normally adapted to be held elevated by a light spring 72, so as to leave open the aperture 69. The spindle $44^a$ is pivoted in the shuttle at $43^a$, and on it is slipped the bobbin $45^a$. The bobbin has pivotally mounted in it an indicator $49^a$, backed by a spring $50^a$, said indicator occupying a slot $47^a$ in the bobbin and being so mounted that the weft or filling $46^a$ overwraps the indicator and keeps it pressed in until the weft is substantially exhausted. Fig. 14 shows the weft overwrapping the indicator and holding it pressed in, and Fig. 17 shows the bobbin substantially denuded of weft and the indicator free. The free end of the indicator $49^a$ is bent so as to provide an inwardly-turned lug 73, which when the indicator is pressed in by the filling or weft, as in Fig. 14, takes over a lug $70^a$ on the free end of the wicket 70 and holds it down, so that the feeler-arm 63 may not enter the shuttle. When, however, the filling $46^a$ is substantially exhausted, the spring $50^a$ presses the indicator outward, as in Fig. 17, from under the lug $70^a$ on the wicket and permits the spring 72 of the latter to elevate it so as to open or uncover the slot 69. When the lay beats up under the normal conditions, the feeler-arm 63 impinges on the wicket and the feeler-lever is rocked, as before described. In Fig. 18, which is a fragmentary illustrative view, the wicket 70 is represented as upheld by its spring 72.

Figure 12:
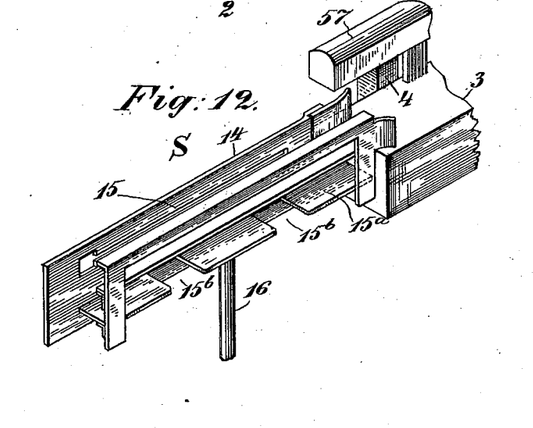
Fig. 12 is a perspective view of the two-celled shuttle box and guide detached, illustrating a slightly-different construction from that seen in Fig. 4.
Figure 13:
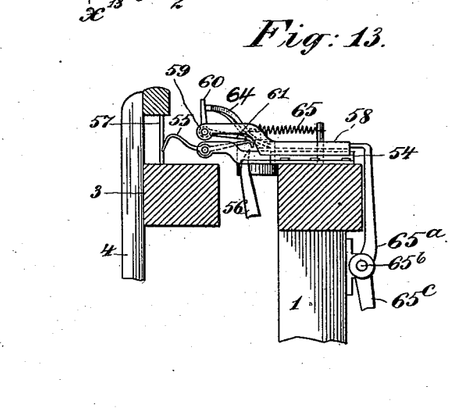
Fig. 13 is a view illustrating the knock-off mechanism. This view is a section substantially at line $x^{13}$ in Fig. 11.

The shuttle-box S, as seen in Figs. 1 to 4, has the swell 18 mounted on it so as to move up and down with it, and thus serve only for the upper cell 15 of the box. The lower cell $15^a$, which is open at the side toward the magazine, is adapted to be closed by the device 23; but the latter device may be dispensed with and the swell 18 be mounted on the guide 14, so as to serve for the cell which is at the picking-point, no matter whether it be the cell 15 or $15^a$. This construction is seen in Figs. 8, 9, 11, and 12, Fig. 11 showing clearly the bracket $14^a$, (on the guide or frame 14,) to which the swell 18 is hinged. In Fig. 12 the bracket $14^a$ and swell 18 are omitted and in Fig. 11 the upper part of the guide 14 is broken away or in horizontal section. It will also be noted in this figure that the feeder 12 has two supporting-fingers $12^a$, that take under the shuttle 11, and when the latter is placed in the cell 15ª the fingers 12ª enter or close into the recesses 15ᵇ in the bottom of the lower cell.

It will be understood that the wicket 70 is a movable interposing part carried by the shuttle and adapted when the lay beats up to impinge upon the feeler 63 and move the latter under normal conditions or when the shuttle is properly provided with weft or filling and that the displacement of this interposing part is permitted or controlled by the substantial absence of weft from the weft-holder or bobbin. When said part or wicket is displaced, it does not of course impinge on the feeler, and the latter is not actuated. The device 70 has been called a "wicket," as it will, by preference, close an aperture in the side of the shuttle; but this aperture may be formed simply by the removal of a part of the shuttle-wall in any way desired to provide a way for the feeler when the wicket is displaced.

The ordinary weft-hammer 56, commonly used with weft stop-motions on looms, is utilized in the construction shown herein to operate the slide 58 as well as the slide 54. This is effected by arranging the tail of the weft-fork 55 (which is to be engaged by the hammer) at the side of or adjacent to the arm 61 of the rocker 59, the hammer being constructed at its operative end to engage either of said arms; but it will be understood that this invention is not limited to the utilization of the ordinary weft-hammer. Any similar vibrating part may be employed, and the slide 58 need not be mounted on the slide 52. The construction shown is simple and enables the ordinary weft-hammer to be used for operating both of said slides.

We are the first so far as we are aware to employ in a weft-supplying mechanism a two-celled shuttle-box shiftable to bring either cell thereof to alinement with the raceway, a magazine, and a vibrating shuttle-feeder which supplies to one of the cells of said box a full shuttle to replace one substantially exhausted, the full shuttle being picked directly from said box and not from the feeder or placer. Therefore we claim this construction in its broadest sense and without limitation to any particular specific construction for effecting the result.

In looms provided with a weft-supplying mechanism it has been proposed to slow down the speed of the loom at the time of replenishing the weft, as in high-speed looms it is found that there is hardly time enough allowed to properly operate the replenishing mechanism and effect the change of the weft carriers or holders, and our loom will be, by preference, provided with a novel means or mechanism for driving it at two rates of speed—namely, the normal rate and a proportionately-slower rate during the weft replenishing or supplying operation. This mechanism has been omitted from Figs. 1, 8, 10, and 11 in order to avoid complicating the drawings; but it is fully illustrated in Figs. 19, 20, 21, 22, and 23 and will now be described.

Figure 22:
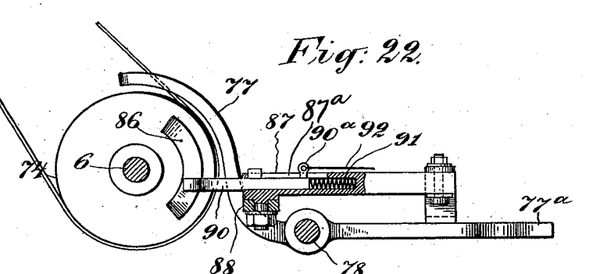
Figs. 22 and 23 are detail views.
Figure 23:
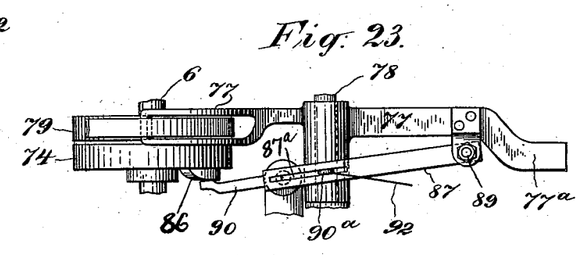

On the shaft 6 are the tight pulley 74 and the loose pulley 75 of the loom. The driving-belt 76 is adapted to be shifted from one of these pulleys to the other for stopping or starting the loom. The belt-shifter 77 plays on a horizontally-arranged guide-bar 78, projecting out from the loom-frame, and on this bar is a spring 78ª, which tends to press the shifter over, so as to keep the belt on the tight or running pulley 74. It may be stated here that the shifter 77 has a prolongation 77ª, which extends into the path of the shipping-lever 52 and is acted upon by the latter to stop the loom when the shipping-lever is set free by the knock-off lever 53. So far as described the operation and general principles of construction are the same as may be found in many looms. On the shaft 6, however, between the tight and loose pulleys 74 and 75, is a pulley 79, the boss of which extends through the boss of the loose pulley 75 and is provided with a gear-wheel 80, which gears with a wheel 81 on a counter-shaft 82, on which is a gear-wheel 83, which gears with the wheel 8. Now if the belt 76 be on the tight pulley 74 the loom will run at its normal speed; but if it be shifted to the pulley 79 the loom will be run at a reduced rate of speed, owing to this pulley driving the loom through the reducing-gears 80, 81, and 83. The period during which the loom should run at a reduced speed is that during which the weft is being replenished, and hence the belt-shifter 77 is actuated to shift the belt from the tight pulley 74 to the intermediate pulley 79 by the means seen in Fig. 8—that is to say, the shaft 84, carrying the rocker 67 68, extends across the loom and has secured on it at the opposite side an arm 85, and this arm controls the operation of the belt-shifter by means that will be best understood by reference to the detail views Figs. 22 and 23. In the first of these views the face of the tight pulley 74 which is next to the loom-frame is shown with a cam 86 thereon to actuate the belt-shifter through the medium of a lever 87. Fig. 23 shows the same parts that are seen in Fig. 22, but in plan. Both of these views show the cam 86 in operation on the lever 87. This lever 87 is fulcrumed at 88 on the loom-frame and is coupled rather loosely to the belt-shifter 77 at 89, and it has in its end next the pulley 74 a longitudinally-sliding bolt or prolongating part 90, backed by a spring 91, as seen in Fig. 22, which represents the lever partly in section. Normally this belt 90 is held retracted by a flexible connector 92, which extends from the arm 85 (on the shaft 84, with the rocker 67 68) to a stud 90ª on the bolt 90. This stud plays in a slot 87ª in the tubular lever 87, and the length of the slot limits the reciprocating movement of the bolt. A spring 93, Fig. 19, suitably disposed and stronger than the spring 91, holds the bolt 90 retracted normally; but when the lever 25 engages the hook 28, Fig. 8, the shaft 84 will be rocked, and thus relax the strain on the connector 92, so that the spring 91 will protrude the bolt 90 into the path of the cam 86 on the tight pulley. In consequence of this when said cam wipes past the nose of the bolt the lever 87 will be moved about its fulcrum, Figs. 22 and 23, and acting on the belt-shifter it will shift the belt onto the intermediate pulley 79, as indicated in Fig. 23. The cam 86 will be of such length as to hold the belt on the slow-speed pulley until the weft is replenished, when it will pass and the spring 78$^a$ will act to shift the belt back to the tight pulley again. In the meantime the cam 24 will have passed and the spring 93 will act through the arm 85 and connector 92 to retract the bolt 90.

As the picker-sticks 94 are operated from the shaft 6, it will be obvious that when the loom slows down they will be operated with less vigor than the normal unless means are provided to maintain the force and momentum of their blows. The mechanism herein provided to overcome this difficulty will now be described.

Figure 20:
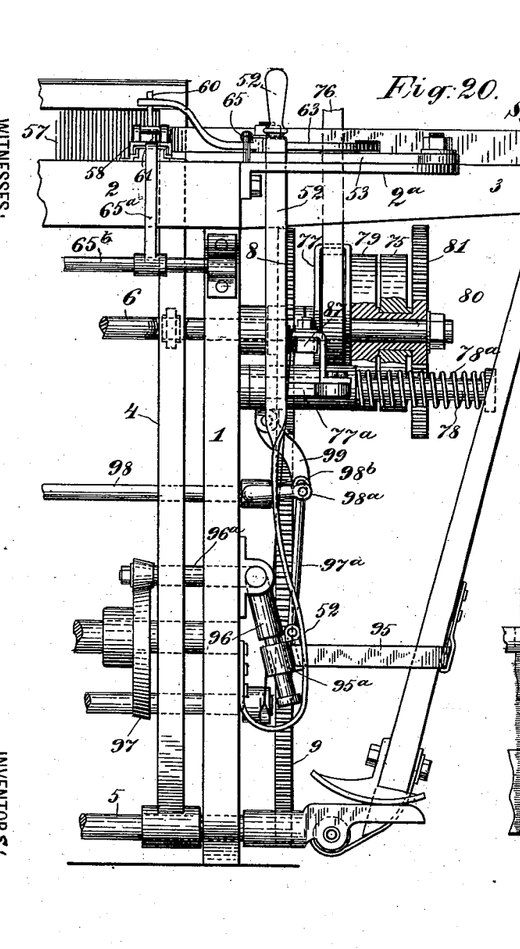
Fig. 20 is a front view of the parts at this side of the loom.
Figure 21:
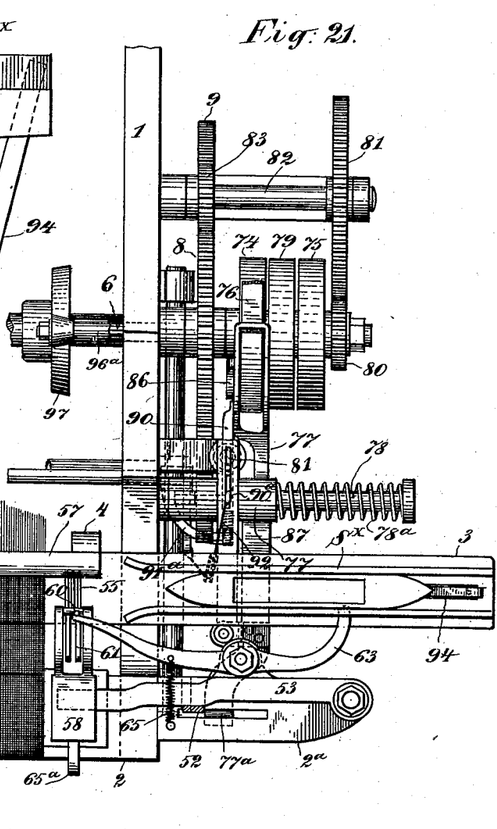
Fig. 21 is a plan view.

The picker-stick is coupled by a strap 95, Fig. 20, to the arm 96 of a rocker mounted in the loom-frame, the other arm 96$^a$ thereof carrying a roller which bears on a rotating cam 97. Every rotation of the said cam imparts a quick movement to the rocker, and this movement is imparted to the picker-stick. This device is the common one employed for operating the picker-stick of a loom. According to our improved construction, however, the strap 95 is coupled to a sleeve 95$^a$, adapted to slide along the arm 96 of the rocker, and this sleeve is coupled by a link 97$^a$ to an arm 98$^a$ on a rock-shaft 98, the boss of the shifter 77 being coupled to another arm 98$^b$ on said shaft by a link 99. By inspection of Fig. 20 it will be noted that normally the link 99 occupies an inclined position, so that when the belt-shifter is moved out in shifting the belt onto the intermediate pulley 79 this link 99 will be straightened and caused to rock the shaft 98 in a manner to cause the link 97$^a$ to move the sleeve 95$^a$ outward on the arm 96. Thus the slower movement of the operating-cam and rocker will be compensated by causing the arm 96 to act on the picker-stick at a point farther from the axis of the rocker. The extent of movement imparted to the stick will also be increased somewhat.

The boss of the shifter is made quite long to obviate side draft, as the power applied to move it is at one side of its sliding bearing.

The loose pulley 75 in the construction shown actually rotates on the boss of the pulley 79, as this disposition facilitates the construction. We do not, however, limit ourselves to the specific features of the construction shown in all respects, as this may be varied considerably without departing materially from the spirit of the invention.

Figure 24:
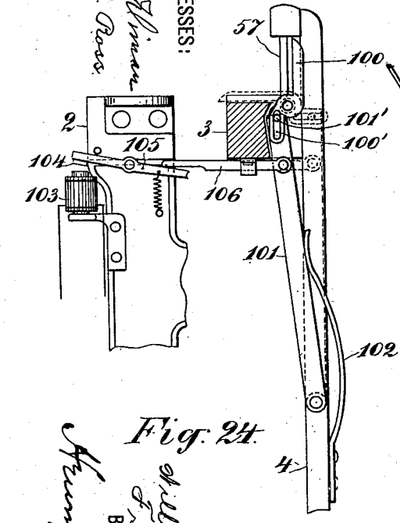
Fig. 24 is a detached view illustrating the construction and application of an automatic weft-end cutter to the loom. This device operates in conjunction with a weft-supplying mechanism.

It is desirable that when a fresh weft-carrier or weft-holder shall be supplied to the loom the weft end from the substantially exhausted weft carrier or holder shall be cut off at or near the selvage of the piece in the loom, and Fig. 24 illustrates an automatic device for effecting this object. This device has been omitted from the general views in order to avoid confusion and complication; but the illustration in Fig. 24 will enable any one skilled in the art to apply it.

On the lay 3, at or near the end of the reed 57, is pivotally mounted a knife 100, the blade of which stands normally erect and practically alined with the reed. The knife is in the form of a lever, the blade being one arm and the other arm, normally below the fulcrum, having in it a slot 100', which is engaged by a stud 101' on an operating-lever 101, fulcrumed below on the lay-sword 4 and backed by a spring 102, which holds the knife upright. Mounted in a suitable position on the loom-frame is an electromagnet 103 in circuit with a generator and with contacts at the shuttle-box, so that when the exhausted shuttle enters the box the circuit will be closed through said magnet. The magnet has an armature 104, carried by an arm of an armature-lever 105, and when the magnet is excited this lever is rocked, so as to bring its other arm into the path of a tappet or dagger 106, carried by the lay and coupled to the operating-lever 101. When the substantially exhausted shuttle enters the box at the picking-point, the magnet 103 will be excited, and when the lay beats up the dagger 106 will impinge on the armature-lever 105 and drive back the operating-lever 101, thus bringing the blade of the knife 100 sharply down on the weft-thread extending from the shuttle to the selvage of the piece in the loom and cutting it off. The remainder of the movement of the lay is compensated by the stud 101' playing along the slot 100', as indicated in dotted lines. The spring 102 acts through the lever 104 to return the knife-blade to its erect position before the next pick. There may be a cross-groove in the raceway for the knife to enter in cutting; but this is not essential to the invention.

Having thus described our invention, we claim—

1. In a loom, the combination with a shuttle-box having two superposed and connected shuttle-cells carried by the lay, and means for putting either of said cells into alinement with the raceway for picking the shuttle therefrom, of a shuttle-magazine, and a vibrating shuttle-feeder for supplying a full shuttle to one of the shuttle-cells of said box, the shuttle-box being shiftable after the shuttle-feeder has supplied a full shuttle to one of the said cells to furnish weft from said full shuttle to the warps in the loom.

2. In a loom, the combination with a shuttle-box having two superposed and connected shuttle-cells carried by the lay, and means for moving said box upward to put the lower cell thereof into line with the raceway for picking a shuttle therefrom, of a vibrating shuttle-feeder for supplying a full shuttle to the lower cell of said box when the upper cell thereof is alined with the raceway, said shuttle-box being movable vertically after the shuttle-feeder has supplied a full shuttle to one of the said cells, said full shuttle being always picked from a shuttle-cell.

3. In a loom, the combination with a shuttle-box having two superposed shuttle-cells, of a vibrating shuttle-feeder for supplying a full shuttle to the lower cell of said box when the upper cell thereof is alined with the raceway, and after a full shuttle has been supplied to the lower cell, means operating during the same pick of the loom for moving said shuttle box upward to put the lower cell thereof into line with the raceway, and for picking the shuttle therefrom, a magazine from which said feeder is automatically supplied, and means, rendered inoperative or operative, respectively, by the presence or substantial absence of weft or filling in the shuttle in play, for setting in operation said feeding mechanism.

4. In a loom, the combination with a shuttle-box having two shuttle-cells, and means for shifting said box to put either cell thereof into alinement with the raceway, said means comprising the rotating cam-shaft, the cam thereon, the cam-lever actuated by said cam, the hook-lever and hook thereon, the main lever, coupled to and actuated by the hook-lever, the elbow-lever mounted on the rod carrying the shuttle-box, the said rod, and the shuttle-feeding mechanism, said mechanism comprising the feeder, the arm carrying the feeder, the stud thereon, engaged by an arm of the said elbow-lever, and the curved arm on the rod supporting the shuttle-box, whereby the full shuttle is first supplied to the box and the box then lifted.

5. In a loom, the combination with the two-celled shuttle-box S, its guide, and the rod 16 supporting said box, of the shuttle-feeder 12, the arm 13 carrying said feeder, the stud 35 on said arm, the arm 36 on the rod 16, and normally under said stud, the lever 34, fulcrumed on the rod 16, one arm of said lever normally extending over the said stud, and means for rocking said lever 34 about its fulcrum.

6. The combination with the two-celled shuttle-box, provided with a rack 22, the guide for said box, and means for moving the box upward in its guide so as to bring the lower cell thereof into line with the raceway, the shaft 20, mounted on the said guide, the segment-rack 21 on said shaft and gearing with the rack 22, and the closer 23, on said shaft, as and for the purpose set forth.

7. In a loom, the cam-shaft, the cam thereon, the cam-lever and its spring, the hook-lever 27, and its hook, 28, provided with an arm 28$^a$, of the rocker 67 68, adapted to actuate said hook, the lever 65, coupled to said rocker for operating the latter, the auxiliary slide for operating the lever 65, the rocker 59 in said slide, the weft-hammer, the feeler-lever, and means carried by the shuttle for operating said feeler-lever when the shuttle in play is properly supplied with weft.

8. In a loom, the combination with a shuttle-feeding mechanism, a normally-vibrating lever or part which moves in unison with the operations of the loom, and intermediate mechanism, between said feeding mechanism and said vibrating part and adapted to be put into operative relation with the latter for operation at proper times, of connecting mechanism controlled by the presence or substantial absence of weft or filling in the shuttle in play for setting in motion said feeding mechanism, said connecting mechanism comprising the feeler-lever mounted on the loom-frame, the arm 63 of said lever being adapted to enter the shuttle-box when the lay beats up, and the other arm taking behind the upright arm 60 of the rocker 59, the said rocker, mounted in the slide 58, and having an arm 61 adapted to be engaged by a weft-hammer 56, the said slide and weft-hammer, the lever 65, adapted to be actuated by said slide, the rocker 67 68, and the rod or link coupling an arm of said rocker with the said lever 65.

9. The combination with a shuttle having an aperture in its side for the entry of a feeler, and provided with a spring-wicket for closing said aperture, of a weft-holder provided with a spring-indicator, adapted to be overwrapped by the weft and to hold said wicket closed until the weft is substantially exhausted and the indicator set free.

10. The combination with a shuttle having a slot or aperture in its side for the entry of a feeler, the wicket 70, pivotally mounted in the shuttle and adapted, when depressed, to close said slot, and the spring 72, which tends, normally, to hold said wicket elevated, of the bobbin or weft-holder in the shuttle, the indicator mounted therein and having an inturned lug 73 to take over the free end of said wicket and hold it depressed, when the said indicator is pressed in by the overwrapped weft or filling, and the spring tending to press said indicator outward.

11. The combination with a shuttle having a movable interposing part, and a feeler mounted on some part of the loom-frame, and normally in the path of said interposing part, of means carried by the shuttle and controlled by the substantial absence of weft or filling therein, for displacing said interposing part, substantially as and for the purpose set forth.

12. In a loom, the combination with an automatic weft-supplying mechanism, of automatic means for reducing the speed of the loom during the supplying period, and automatic means for maintaining the force of the stroke of the picker-stick during the period of reduced speed, said means operating in conjunction with the supplying mechanism, substantially as set forth.

13. In a loom, the combination with an automatic weft-supplying mechanism, of means for reducing the speed of the loom during the supplying period, said means comprising a driving-belt, a driving-shaft, a normal driving-pulley fixed on said shaft and embraced by the belt, a low-speed pulley loose on said shaft, gearing between the latter pulley and the shaft, a shifter for shifting the belt from one of said pulleys to the other, and automatic means controlled by the weft-supplying mechanism, for operating said shifter to reduce the speed of the loom, substantially as set forth.

14. In a loom, the combination with an automatic weft-supplying mechanism, and means for reducing the speed of the loom during the supplying period, said means being controlled by the supplying mechanism, of the picker-stick, the cam, cam-shaft and rocker, which actuates said picker-stick, and mechanism between the said strap and the speed-reducing mechanism whereby the latter shifts the strap so as to vary the distance of its connection to the rocker-arm from the center of oscillation of the rocker, substantially as set forth.

15. In a loom, the combination with an automatic weft-supplying mechanism, of automatic means for reducing the speed of the loom during the supplying period, and automatic means for increasing the length of the stroke of the picker-stick during the period of reduced speed, said means operating in conjunction with the speed-reducing means and both being controlled by the supplying mechanism.

16. In a loom, the combination with the driving-shaft, the normal tight and loose pulleys thereon, the driving-belt, and the shifter for the belt, of the intermediate pulley 79, the gearing by which it drives the shaft, the lever 87, coupled to the shifter at one end and provided with a prolonging spring-bolt 90, the cam on the tight pulley adapted to act on the bolt 90 for operating the belt-shifter, the spring for returning the shifter to the tight pulley, and a weft-replenishing mechanism controlling the operation of the bolt 90, substantially as set forth.

17. In a loom, the combination with the belt-shifter 77, the rock-shaft 98, and the link 99, coupling the belt-shifter to an arm on said shaft, of the rotating, picking-cam 97, the rocker 96 actuated by said cam, the picker-stick, the strap coupling said stick to an arm of the rocker 96, and a link 97ª, coupling an arm on the rock-shaft 98 to said belt, whereby the movement of the belt-shifter shifts the connection of the strap outward along the arm of said rocker, substantially as and for the purpose set forth.

18. A shuttle having an aperture in its side for the entry of a feeler and provided with means for normally closing said aperture, and means for opening said aperture when the weft or filling carried by the shuttle is substantially exhausted.

19. In a loom, the combination of a weft or filling supplying mechanism, means for controlling the times of operation thereof, said means consisting of a feeler, a shuttle having an aperture in its side for the entry of said feeler, means for normally closing said aperture, and means for opening said aperture when the weft or filling carried by the shuttle is substantially exhausted, thereby allowing the feeler to enter the aperture and actuate said supplying mechanism.

20. In a loom, the combination with an automatic weft-replenishing mechanism, of the knife or cutter, 100, pivotally mounted on the lay, and having a slot 100′, the lever 101, having a stud 101′ engaging said slot, the spring 102, the dagger 106, coupled to the said lever, and means for actuating said lever 101, controlled by said weft-replenishing mechanism.

In witness whereof we have hereunto signed our names, this 17th day of September, 1900, in the presence of two subscribing witnesses.

WILLIAM H. BAKER.
FREDERIC E. KIP.

Witnesses:
PETER A. ROSS,
F. D. DIMAN.